United States Patent [19]
Smith et al.

[11] Patent Number: 5,517,566
[45] Date of Patent: May 14, 1996

[54] METHOD FOR ALLOCATING AGENT RESOURCES TO MULTIPLE TELEPHONE CALL CAMPAIGNS

[76] Inventors: B. Scott Smith, 35 White Plains Ave., Londonderry, N.H. 03053; Anthony Curreri, 53 Pilgrim Dr., Litchfield, N.H. 03051

[21] Appl. No.: 252,337

[22] Filed: Jun. 1, 1994

[51] Int. Cl.$^6$ .................................................. H04M 3/00
[52] U.S. Cl. ........................ 379/265; 379/266; 379/309; 379/356
[58] Field of Search ................................. 379/214, 265, 379/266, 309, 356

[56] References Cited

U.S. PATENT DOCUMENTS

| | | | |
|---|---|---|---|
| 5,025,468 | 6/1991 | Sikland et al. | 379/260 |
| 5,179,589 | 1/1993 | Syu | 379/266 |
| 5,214,688 | 5/1993 | Szlam et al. | 379/137 |
| 5,295,184 | 3/1994 | Smith et al. | 379/216 |
| 5,297,195 | 3/1994 | Thorne et al. | 379/218 |
| 5,327,490 | 7/1994 | Cave | 379/309 |

*Primary Examiner*—Jeffery Hofsass
*Assistant Examiner*—Parag Dharia
*Attorney, Agent, or Firm*—Daniel J. Bourque; Kevin J. Carroll

[57] ABSTRACT

A method for allocating resources, such as agents, to multiple tasks such as call campaigns in a telephony system includes establishing at least first and second tasks, each task including a pacing ratio, a task attribute, and at least one group of processes to be executed. The first and second task attributes are assigned to at least one resource which is provided for servicing the first and second group of processes. After the tasks are initiated, the resource having the first and second task attributes is allocated to servicing at least one process from each of the first and second groups of processes. The method also includes computing the balanced condition of each task and if the task is out of balance, reallocating system resources to each task for which the resource maintains a task servicing attribute.

8 Claims, 3 Drawing Sheets

METHOD FOR ALLOCATING AGENT RESOURCES TO MULTIPLE TELEPHONE CALL CAMPAIGNS

FIELD OF THE INVENTION

This invention relates to telephony management systems and more particularly, to a method for allocating resources such as agents to multiple call campaigns as fractional agent resources.

BACKGROUND OF THE INVENTION

Many types of businesses, such as customer service organizations or credit collection agencies, utilize automated call distribution systems which route incoming or outbound telephone calls to operators or agents in one or more various departments. Such systems assign at least one agent to a particular type of call campaign prior to initiation of the call campaign. The agents remain attached to the one preselected call campaign until the completion of the call campaign.

The prior art systems are limited, however, in that the assigned agents are bound to that particular call campaign until the agent, or agent supervisor, logs the agent onto a new call campaign. As one call campaign encounters periods of reduced activity, while other executing call campaign encounters periods of over-burdening activity, the agents are incapable of providing assistance to the other call campaigns without manual, supervisory intervention.

Some systems provide additional resources, such as overflow agents, which are allocated to the call campaigns during the periods of increased activity to assist the over burdened agents. However, these overflow agents remain idle between assignments, thus resulting in inefficient added costs as well as the need for additional resources.

An additional limitation of the prior art systems is realized as multiple call campaigns come to an end at the same time. Although the activity of the call campaigns is reduced due to the lessened number of calls to service, the preselected number of agents assigned to each campaign are bound to their respective campaigns until the campaign is completed. The inability of the systems to shift agents to different individual call campaigns or multiple call campaigns, as the call activity decreases, results in system inefficiencies and increased costs.

Accordingly, what is needed is a system and method for providing agents with multi-threaded campaign attributes such that agents may be assigned to multiple call campaigns simultaneously. As the need for an agent decreases on one campaign and increases on another, the agent is automatically shifted to the over burdened call campaign. Further, what is needed is such a method for automatically shifting the agents from one call campaign to another, without the requirement of supervisory intervention, while automatically adjusting or controlling call pacing.

SUMMARY OF THE INVENTION

This invention features a method for allocating resources, such as agents, to multiple tasks such as campaigns in a telephony system. The method includes the steps of establishing at least first and second tasks, each task including a pacing ratio, a task attribute and at least one group of processes. The first and second task attributes of each of the first and second tasks are assigned to at least one system resource, for allowing the system resource to service the first and second group of processes of the first and second tasks.

Subsequently, the first and second tasks are initiated by initiating at least a first process from each of the at least first and second group of processes. The at least one resource having the first and second task attributes are allocated to service at least one process from the first and second groups of processes.

Additionally, a resource ratio may be computed for each resource assigned to each of the tasks. Further, a resource ratio for each of the resources may also be computed. In this manner, the system may be kept in balance by assuring that resources are divided or assigned to each task for which the resource has the appropriate task attribute.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
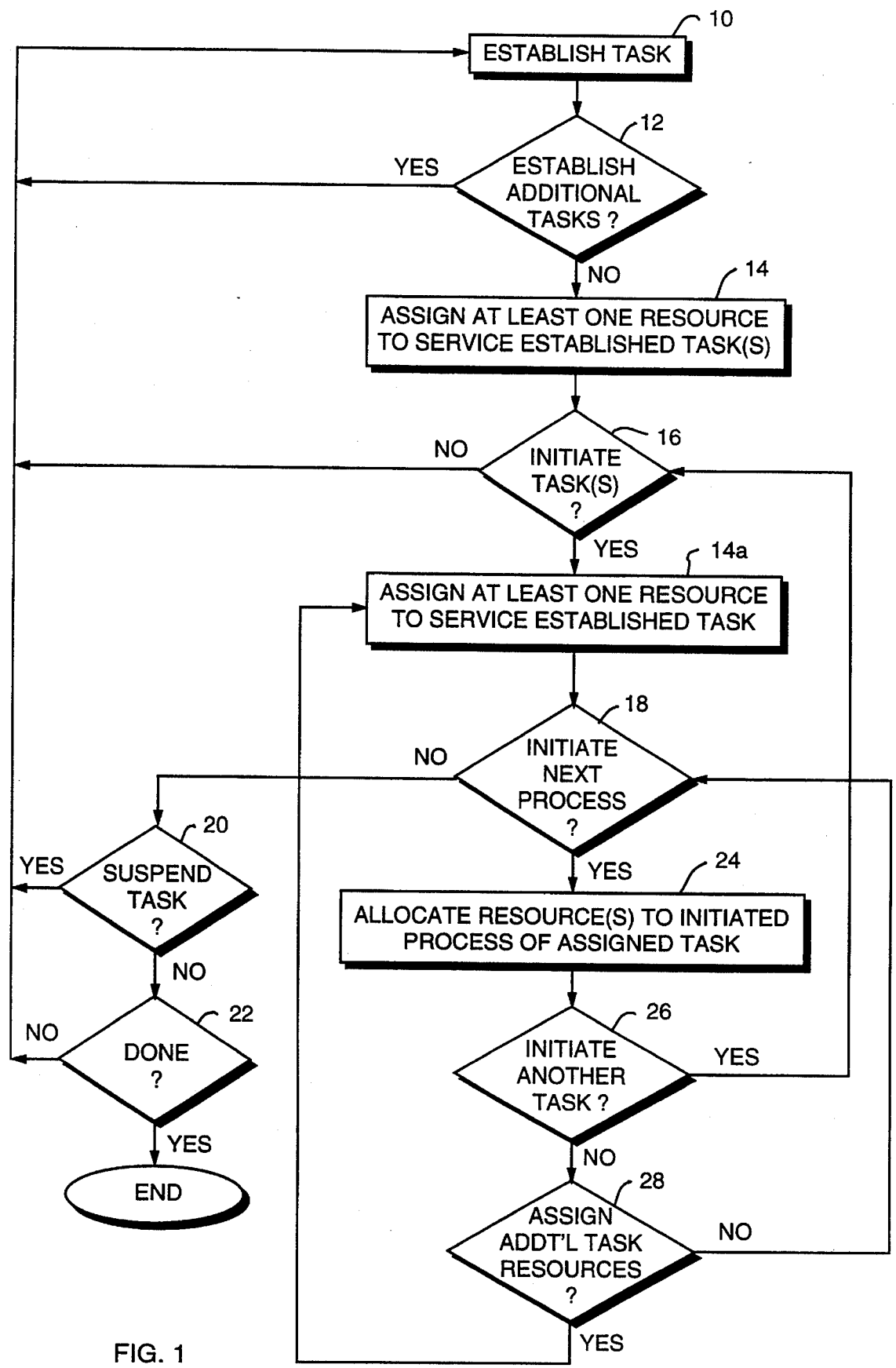
FIG. 1 is a flow chart illustrating the allocation of system resources to each assigned task according to one aspect of the present invention.
Figure 2:
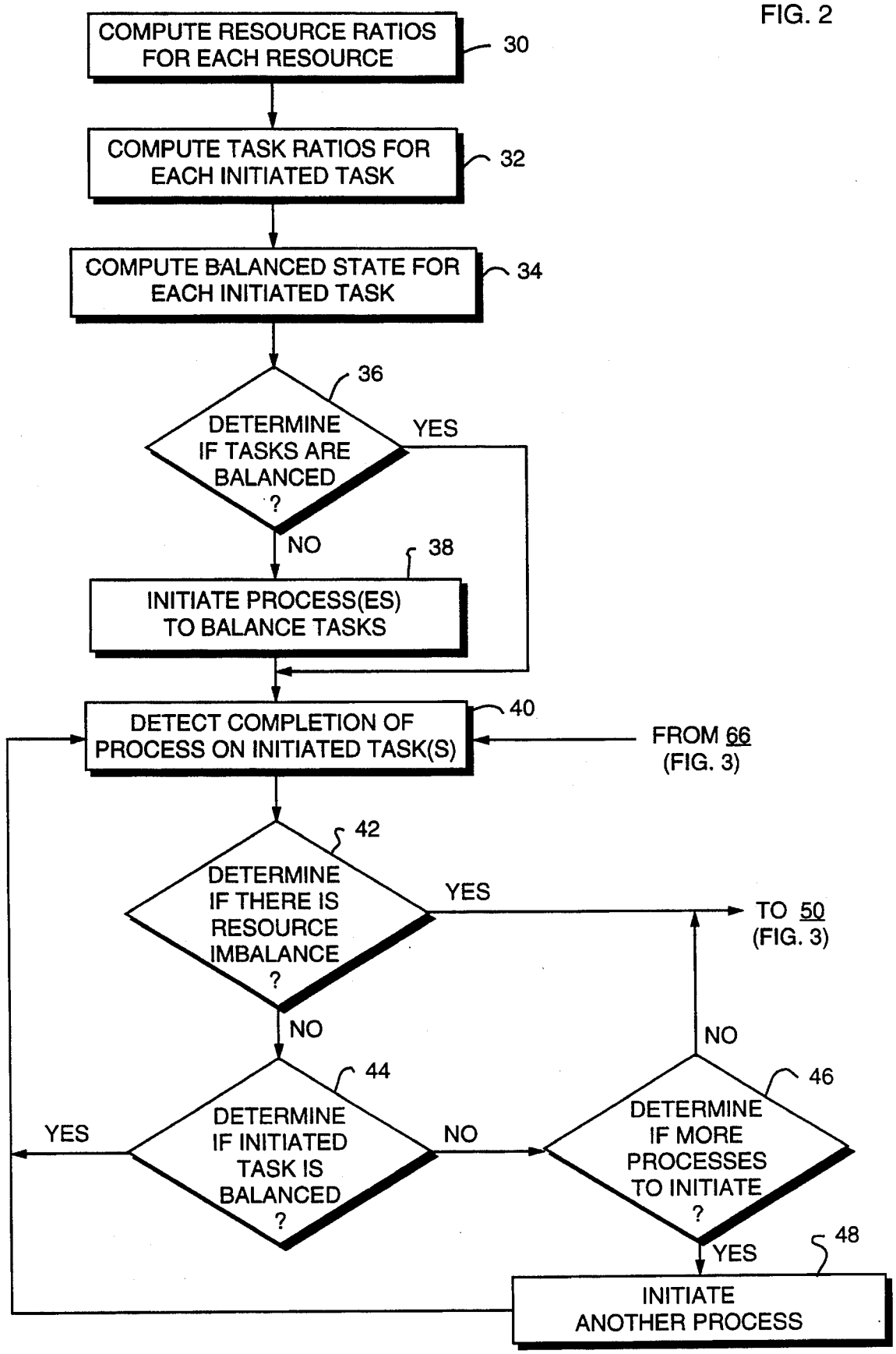
FIG. 2 is a flow diagram illustrating the steps of computing system and resource balance according to another aspect of the present invention.

The user first establishes a task, step 10, FIG. 1, and described in greater detail in FIG. 2 of U.S. patent application Ser. No. 08/252,339, and assigned to the assignee of the present invention and incorporated herein by reference. The processing steps of establishing a task in the present invention corresponds directly to the processing steps of establishing a call record campaign as described by co-pending U.S. patent application Ser. No. 08/252,339. Additional tasks may be established, step 12, and in accordance with the present invention, at least one additional task is established at this processing step.

After the tasks are established, at least one resource is assigned to service an established task, step 14. In accordance with the present invention, at least one resource is assigned to at least two of the established tasks, concurrently. Further, in the preferred embodiment as described by U.S. patent application Ser. No. 08/252,121, and incorporated herein by reference, each resource comprises an agent or operator utilized to service calls from an inbound call campaign or an outbound call campaign.

The resources may be assigned to established tasks either before a task is initiated, step 16, as shown in processing step 14, or may be assigned to a task after the task is initiated as shown in processing step 14a. The method of assigning resources to tasks are identical to the processing steps of assigning agents to call campaigns as described by U.S. patent application Ser. No. 08/252,121, and incorporated herein by reference, and also described in U.S. patent application Ser. No. 08/252,338, entitled UNIVERSAL TELEPHONY APPLICATION CLIENT THAT IS CONFIGURABLE FROM A PROFILE FOR A TELEPHONE CALL CAMPAIGN incorporated herein by reference.

As each task is established, the established task is assigned an identifying campaign attribute, such as campaign A, first campaign or even campaign Bob. Resources are assigned to a task by attaching the campaign attribute of that task to the resource. As a feature of the present invention, multiple campaign attributes may be attached to a particular resource, thereby sharing the resource between the multiple campaigns.

Further, the processing step of initiating a task, step 16, is identical to the processing steps initiated in a call campaign as described by U.S. patent application Ser. No. 08/252,339, incorporated herein by reference, and in particular, to processing steps 18a–18c of the above-mentioned U.S. Patent Application.

In response to an initiated task, the system begins initiating the next process included in the initiated task, step 18. The method of determining the number and timing of initiated processes is described below in greater detail below in conjunction with FIG. 2. The user has the option of allowing the system to automatically initiate the next process as needed or may suspend the task, step 20, to establish additional tasks or may end the task at step 22, such as at the end of a business day.

As a process is initiated on each initiated task, resources are allocated to service the initiated process as resources having the campaign attributes of the initiated tasks meet the campaign attribute of the initiated process, step 24. By attaching multiple campaign attributes to a particular resource, resources are capable of servicing processes from multiple tasks and thus, as a feature of the present invention, are not bound to a particular task.

At step 26, additional established tasks may be initiated subsequent to initiation of at least one task. Further, at least one resource may be assigned an additional task attribute, step 28, at any time after tasks have been initiated. Otherwise, the resources continue to service initiated processes from tasks having the task attributes meeting the attributes attached to each resource.

The processing steps of initiating a process or task, steps 16 and 18, are described in greater detail in conjunction with FIG. 2. Processes are initiated by first computing resource ratios of each resource assigned to each task, step 30. For example, a resource assigned to two tasks possesses a resource ratio of 0.5 for each task and is computed according to the formula:

$$RR = \frac{1}{n} \quad (1)$$

where RR equals the resource ratio for a particular resource for each assigned task and n equals the number of tasks to which the particular resource is assigned.

Task ratios are next computed for each initiated task, Step 32, by summing the resource ratios for that particular task. For example, an initiated task with two resources assigned to that task, each resource having a resource ratio of 0.5 for that task, has a total task resource of 1.0. The task's resource is determined according to the formula:

$$TR=RR_1+RR_2+RR_n \quad (2)$$

where TR is the task resource for an initiated task and $RR_1$ and $RR_2$ equal resource ratios of resources having the task attributes of the initiated task and $RR_n$ equals all additional resource ratios of resources having the task attribute of the initiated task.

The balanced state (BS) for each initiated task is computed at step 34 by multiplying the task resource and pacing ratio associated with each initiated task according to the formula:

$$BS=TR \times PR \quad (3)$$

where BS equals the balanced state for an initiated task, TR equals the task resource of the initiated task and PR equals the pacing ratio associated with the initiated task.

The balanced state of an initiated task determines the number of processes which must be initiated or outstanding at any given time based on the total resource allocated to the initiated task.

The system determines if each task is balanced, step 36, by comparing the number of outstanding processes on an initiated task with the balanced state for that task. For each initiated task, if the task is determined to be imbalanced, call processes are initiated to balance the tasks, step 38.

If the tasks are determined to be balanced, the system next detects the completion of the process on each of the initiated tasks, step 40. After detecting the completion of a process, the system determines if any of the resources are imbalanced, step 42. If one of the resources are imbalanced, the resource ratios are modified in response to the resource imbalance at step 50, FIG. 3, described below in greater detail.

Resources become imbalanced as additional task attributes are attached to a resource after resource ratios have been computed for the resource. By way of example, Table 1 illustrates the condition in which resources become imbalanced immediately after additional task attributes are attached to a particular resource.

TABLE 1

| Tasks | Resource Ratios | | Task Resource |
|---|---|---|---|
| | $RR_1$ | $RR_2$ | TR |
| 1 | 1.0 | 1.0 | 2.0 |
| 2 | 0 | 0 | 0 |
| 3 | 0 | 0 | 0 |

Immediately prior to task attributes from task 2 and task 3 attaching to resource 1 and resource 2, the resource ratio of resource, $RR_1$ is 1.0 on task 1 and similarly, the resource ratio of resource $RR_2$ is 1.0 on task 1, combining for a total task ratio of 2.0 for task 1. Immediately after attaching task attributes from task 2 and task 3 to resource 1 and resource 2, $RR_1$ equals 0 for task 2 and task 3 and $RR_2$ equals 0 for task 2 and task 3. A resource imbalance thus exists for resource 1 and resource 2, which should have resource ratios of 0.33 for task 1, task 2 and task 3, as determined by formula 1, above. The method of modifying the actual resource ratios to equal the ideal resource ratio of 0.33 in the above example, is discussed below in conjunction with FIG. 3.

However, if the resources are balanced, i.e., not imbalanced, the system determines if the initiated tasks are balanced, step 44. A task is balanced when the number of outstanding processes equals the balanced state for that task. If the task is balanced, the system returns to step 40 to detect another completion of a process on the particular task. Those skilled in the art will recognize that as multiple tasks are initiated, one task may not be balanced, while the other tasks may be balanced.

If a task is not balanced, the system determines if more processes are available to initiate, step 46. If more processes are available, another process is initiated, step 48, wherein the system returns to step 40 to detect completion of another process on the task.

Figure 3:
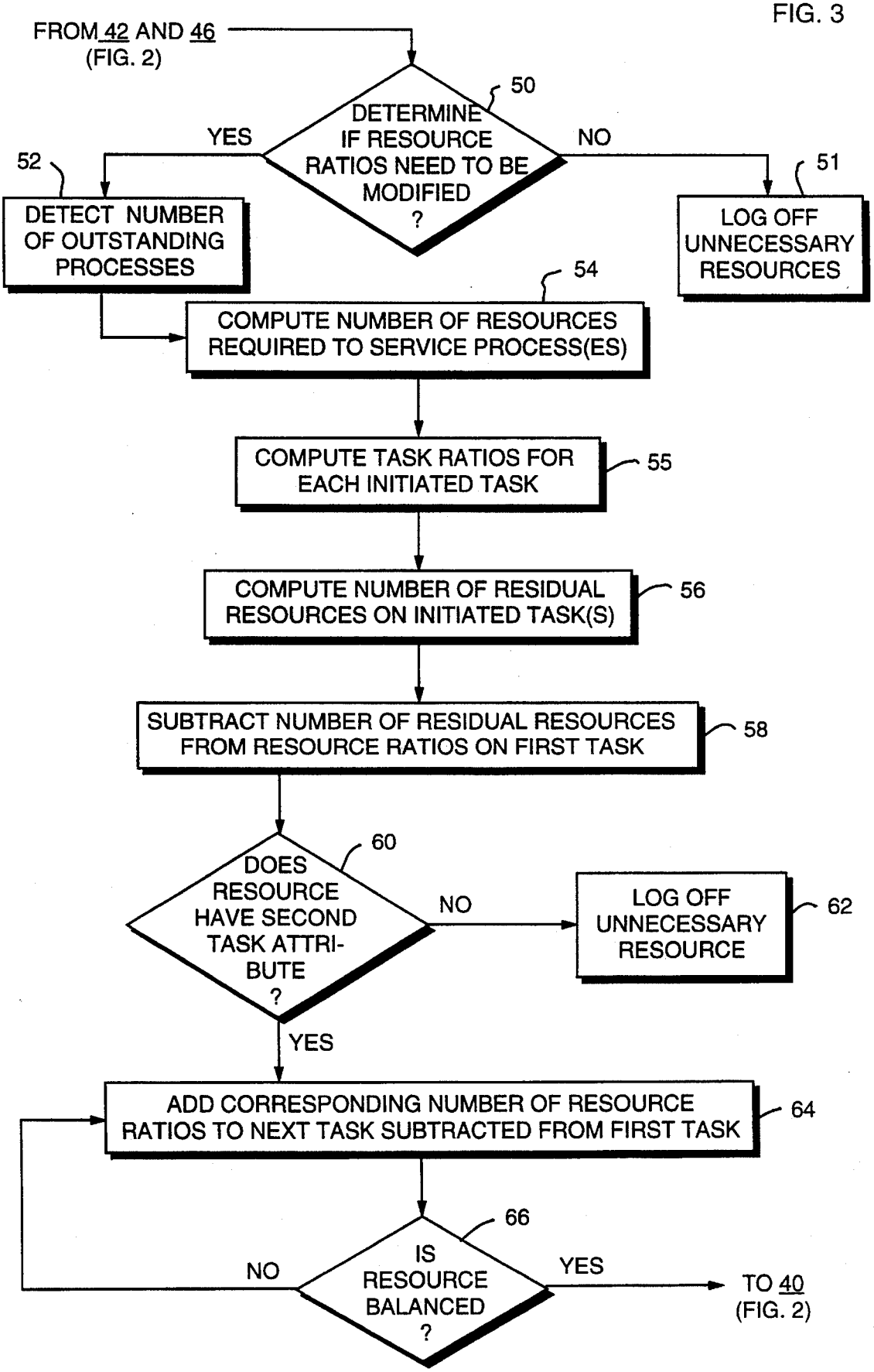
FIG. 3 is a flow diagram illustrating the step of balancing system tasks and resources according to yet another aspect of the present invention.

If there are no more processes to initiate, such as when the task is ending, the resource ratios for each resource on the ending task are modified in response to the number of the task imbalance at step 50, FIG. 3, thereby modifying the processes initiated on the other initiated tasks, as described below in conjunction with FIG. 3.

As mentioned above, the system imbalances, either by a task or a resource imbalance, is determined after the completion of a process is detected on an initiated task and when task attributes associated with a particular resource or resources are changed. After determining a system imbalance is present, the system determines if the resource ratios are required to be modified to balance the system, step 50, FIG. 3. If the resource ratios do not need to be modified, the initiated tasks are either completed and unnecessary agent resources are logged off, or a subsequent process is initiated, thus maintaining the system balance step 51.

After determining that the resource ratios need to be modified to balance the system, the system detects the number of outstanding processes on the task for which a process has completed, step 52. For the first initiated task, the system computes the number of total task resources required to service the number of outstanding processes detected by the system, step 54. The total task resources (TR) are computed according to the following formula:

$$TR = \frac{OP}{PR} \quad (4)$$

where OP equals the number of outstanding processes for each initiated task and PR equals the pacing ratio of each initiated task.

The current total task resource for the first initiated task is computed in step 55, in accordance with formula 2, above. The computed task resource required to service the number of outstanding processes is then compared with the computed total task resource for the first initiated task. The difference between the two values is the computed residual resource for this task, step 56.

The first initiated task is balanced by subtracting the residual resource from the first resource ratio on the first initiated task. If the value of the residual resource is larger than the value of the first resource ratio, then the difference from subtracting the resource ratio from the residual resource is then subtracted from the second resource ratio, and then the third resource ratio, until the entire residual resource value is subtracted from the first initiated task.

As mentioned above in conjunction with FIG. 2, the system may become imbalanced by either a resource imbalance or a task imbalance. A resource imbalance occurs when additional task attributes are added to a resource after at least a first task has been initiated and resource ratios have been computed for that particular resource as shown in Table 1 above. A task becomes imbalanced as an initiated task begins to wind down, or enters an ending condition, wherein there are no more call processes to initiate on the initiated task. Examples of how resource ratios are modified for the two different types of imbalanced states are provided below in conjunction with Examples 1 and 2.

Modifying the resource ratios on the first initiated task balances the task, but creates an imbalance in the resource ratio of at least the first resource. Summing the resource ratios for each resource must always equal the value of 1. For example, a resource having the task attributes of 2 tasks, has a resource ratio of 0.5 for each task, in accordance with formula (1), above. Summing the resource ratios equals a value of 1.

Thus, after modifying the resource ratio of the first resource on the initiated task, the system detects whether a second task attribute has been attached to the resource, step 60. If there is not a second task attribute attached to the resource, the resource is logged off of the system after completion of the first initiated task, step 62.

If at least a second task attribute has been attached to the first resource, the resource ratio is increased on the second task corresponding to the number subtracted from the resource ratio from the first task. For example, a resource having a first and second task attribute, the resource ratio equalling 0.5 for each task, if 0.25 is subtracted from the first task, then 0.25 is added to the resource ratio on the second task, thereby providing a total value of 1.0 for the resource ratios of the first resource.

As mentioned above, there are two situations which create a system imbalance, the ending condition of a first task, or additional task attributes added to a resource after initiation of a first task. In the first situation, as the number of outstanding processes to service decrease on the first task, the resource ratios for the resources decrease accordingly. A corresponding value is added to the resource ratios on the second task, thereby increasing the number of processes initiated on a second task. This method of balancing the resource ratios for each resource also balances the number of processes initiated by the system at a given time.

In the second situation, wherein additional task attributes are added to at least one resource after a first task has been initiated, the resource ratios are gradually modified after a process has been completed on the initiated tasks in order to maintain a system balance. The system remains balanced as the number of processes initiated for all initiated tasks remains constant, at any given time. Examples of the processing steps of modifying resource ratios of a resource provided with additional task attributes is provided below in conjunction with Tables 7a and 7b, Example 2.

If the amount added to the resource ratio of a first resource on the second initiated task is less than the amount subtracted from the first resource ratio, then the resource still remains imbalanced, Step 66. Therefore, the difference in the amount added to the second resource ratio and the amount subtracted from the first resource ratio is added to the resource ratio for the third task, thereby balancing the resource ratios of the resource. The steps are repeated for all of the resources until all of the resources and tasks are balanced. The system returns to Step 40, FIG. 2, to detect the completion of another process from one of the initiated tasks, thereby repeating the processing steps for modification to the resource ratios of each resource.

EXAMPLE 1: MODIFICATIONS TO THE RESOURCE RATIOS DUE TO A TASK IMBALANCE

As mentioned above in conjunction with FIGS. 2 and 3, as a first initiated task begins to wind down or enters an ending condition, the initiated task becomes imbalanced. Referring to Table 2a below, the values for resources and tasks prior to the first initiated task entering an ending condition, is provided. Two resources are shown, Resource 1 and Resource 2, each having the task attributes of Task A and Task B, and each resource having a resource ratio of 0.5 for each task. As seen in the system balance column for each resource, the resource ratios total 1.0 for each resource.

Summing the resource ratios of Resource 1 and Resource 2 on Task A provides a task resource of 1.0 for Task A. Multiplying the task resource of Task A by the pacing ratio (4:1) provides a balanced state of 4, representing 4 processes to be initiated based on the total resources available on Task A to service the initiated processes. Similarly, the same computations are made for Task B with the same results due to the pacing ratio being identical for Task A and Task B. As seen in the system balance column under the balanced state, the number of processes the system can initiate at a given time equals the value of 8.

Referring to Table 2b, Task A is shown in an imbalanced state, since the number of outstanding processes equals 3, which is less than the number of processes in which the total resources on Task A is capable of servicing at a given time (balanced state). Therefore, an excess number of resources are available on Task A for servicing on the number of outstanding processes available, which is referred to as residual resources.

The residual resources are computed by dividing the outstanding processes (3) by the pacing ratio for the task (4:1) equalling a value of 0.75, representing the modified task resource required. The modified task resource (0.75) is subtracted from the initial task resource (1.0) equalling residual resources on Task A in the value of 0.25. Therefore, a value of 0.25 is subtracted from the resource ratios on Task A, thereby balancing Task A. In the preferred embodiment, the total amount of residual resources are subtracted from the first resource to attach to Task A, Resource 1. If the resource ratio for the first resource is less than the residual resource value, then the difference is subtracted from the resource ratio for the second resource on Task A.

In an alternative embodiment, Table 2c, the resource ratios of each resource on Task A are reduced identically as the task ratio is reduced, based on the formula:

$$RR = \frac{OE}{PR} / N \qquad (5)$$

where RR equals the resource ratio for each resource on Task A, OE equals the number of outstanding processes detected on Task A, PR equals the pacing ratio for Task A and N is the number of resources assigned to Task A.

Modifications to the resource ratios of the resources on Task A requires a modification to the resource ratios of each resource on Task B in order to maintain the resource balance for each resource. Referring to Table 2b, modifying the resource ratio for the first resource to the value of 0.25 requires the resource ratio of the first resource on Task B to be the value of 0.75 in order to maintain the resource balance of 1.0. Since the resource ratio for the second resource on Task A was not modified, the resource ratio for the second resource on Task B does not require modification, thereby maintaining a resource balance of 1.0 for the second resource.

Alternatively, referring to Table 2c, modifications to the resource ratios of the first and second resources on Task A to the value of 0.375 requires modifications to the resource ratios of the first and second resources on Task B to the value of 0.625 in order to maintain the resource balance for each resource of the value of 1.0.

Referring to Task B on either Table 2b or Table 2c, modifications to the resource ratios of the first and second resources provides an increased task resource of the value of 1.25. Multiplying the modified task ratio by the pacing ratio for Task B (4:1) provides a value of five outstanding processes for which the total amount of resources on Task B is capable of servicing.

Therefore, at this juncture, the system initiates an additional process on Task B to increase the number of outstanding processes to the value of five. As seen in the system balance column, the total number of outstanding processes remains constant compared with the number of processes outstanding in this system while in the balanced state, Table 2A.

The resource ratios for the resources on Tasks A and B are again modified after the completion of a process on Task A according to the processing steps, above.

TABLE 2A

| | Resources | | Task Resource | Pacing Ratio | Balanced State |
|---|---|---|---|---|---|
| | 1 | 2 | | | |
| Tasks | | | | | |
| A | .5 | .5 | 1.0 | 4.1 | 4 |
| B | .5 | .5 | 1.0 | 4.1 | 4 |
| System Balance | 1.0 | 1.0 | 2.0 | — | 8 |

TABLE 2B

| | Resources | | Task Resource | Pacing Ratio | Outstanding Process(es) |
|---|---|---|---|---|---|
| | 1 | 2 | | | |
| Tasks | | | | | |
| A | .25 | .5 | .75 | 4:1 | 3 |
| B | .75 | .5 | 1.25 | 4:1 | 5 |
| System Balance | 1.0 | 1.0 | 2.0 | — | 8 |

TABLE 2C

| | Resources | | Task Resource | Pacing Ratio | Outstanding Process(es) |
|---|---|---|---|---|---|
| | 1 | 2 | | | |
| Tasks | | | | | |
| A | .375 | .375 | .75 | 4:1 | 3 |
| B | .625 | .625 | 1.25 | 4:1 | 5 |
| System Balance | 1.0 | 1.0 | 2.0 | — | 8 |

EXAMPLE 2: MODIFICATIONS TO THE RESOURCE RATIOS DUE TO A RESOURCE IMBALANCE

As mentioned above in the conjunction with FIGS. 2 and 3, attaching additional task attributes to a resource after a first task has been initiated causes the resource to become imbalanced. Referring to Table 3A, prior to adding Task Attribute B and Task Attribute C to resources 1, 2 and 3, the resource ratios on Task A for each of the resources was the value of 1.0. The total of task resource was the value of 3.0, which when multiplied by the pacing ratio of 2:1 produced a balanced state of 6 processes capable of being serviced by the resources assigned to Task A at any given time.

Immediately upon attaching Task Attribute B and Task Attribute C to resources 1, 2 and 3 provides a resource ratio equalling the value of 0 for each resource on Task B and Task C, resulting in a task resource of 0 for Task B and Task C and a balanced state of 0 for Task B and Task C. As mentioned above in conjunction with FIG. 2, resource ratios are only modified after a process has been completed.

Referring to Table 3B, the resource ratios are provided for each resource as one resource is completed on Task A. Due to the resource imbalance for each of the resources the balanced state on Task A is suspended at the value of 5 in order to reduce the resource ratios of each of the resources. Dividing the pacing ratio (2:1) into the balanced state for Task A provides a modified task ratio equalling the value of 2.5, representing the total resources on Task A required to service the five outstanding processes. Thus, a residual resource value of 0.5 is computed by subtracting the modified task resource (2.5) from the initial task resource (3.0).

The residual resource value is subtracted from the first resource, equalling a resource ratio for the first resource in the value of 0.5, thereby balancing Task A. Refer to Table 2b, above, for a discussion of how the resource ratios may be modified equally among the three resources for Task A as the task ratio is reduced.

Modifications to the resource ratios of the first resource on Task A creates a system resource imbalance, thereby requiring modifications to at least the resource ratios on Task B, in order to equal the value of 1.0.

Since the resource ratios for Task A was reduced by 0.5, the resource ratio for Task B for the first resource must be increased. However, the ideal resource ratio for a resource having three task attributes is 0.333, which therefore represents the total amount which may be added to the resource ratio for the first resource on Task B. Thus, an excess in the value of 0.167 remains from the residual resource which is therefore added to the resource ratio of the first resource on Task C, thereby providing a total resource ratio of 1.0 for Resource 1. Similarly, Resources 2 and 3 possess total resource ratios of 1.0 since the resource ratios on Task A have not yet been modified.

As a second process is completed on Task A, thereby providing 4 outstanding processes on Task A, the balanced state remains suspended at the value of 4. Dividing the balanced state by the pacing ratio (2:1) for Task A equals a modified task resource of 2.0, representing the total number of resources required on Task A to service the four outstanding processes. Reducing the task resource to a value of 2.0 provides a residual resource value of 0.5 (modified task resource 2.0 subtracted from initial task resource 2.5). The residual resource value is first subtracted from the resource ratio of the first resource on Campaign A bringing the resource ratio value down to 0.33 which is the ideal resource ratio, as mentioned above. Thus, a portion of residual resource still exists which must be subtracted from the resource ratio of the second resource on Task A, thereby balancing Task A, as shown.

Reducing the resource ratio of the first resource on Task A from the value of 0.5 to a value of 0.33 provides a difference of 0.167 which is added to the resource ratio of the first resource on Task C, bringing the resource ratio to the value of 0.33, thereby providing a total of resource ratios for the first resource equalling the value of 1.0. Further, the resource ratios for the first resource for each task equals the value of 0.33, thereby meeting the ideal resource ratios for that resource.

However, Resource 2 remains imbalanced. Since the resource ratio on Task A for the second resource was reduced from a value of 1.0 to a value of 0.667, providing a difference of 0.33, the resource ratio on Task B is increased to 0.33, thereby totalling the resource ratios for the second resource equals the value 1.0. However, the second and third resources still remain imbalanced since all of the resource ratios do not yet equal 0.33 for each of the three tasks.

Therefore, the resource ratios for the second and third resources continue to be modified as processes are completed on Task A, in accordance with the processing steps mentioned above, until each of the resource ratios for the second and third resources equals a value of 0.33 for each of the tasks. Those skilled in the arts will recognize that as processes are completed on Task B and Task C, new processes are initiated to maintain the modified balanced state. Further, after the resource ratios on Task A equals a value of 0.33 for each of the resources, as a process is completed on Task A a new process is initiated to maintain the modified balanced state.

TABLE 3A

| | Resources | | | Task | Pacing | Balanced |
| | 1 | 2 | 3 | Resource | Ratio | State |
|---|---|---|---|---|---|---|
| Tasks | | | | | | |
| A | 1.0 | 1.0 | 1.0 | 3.0 | 2:1 | 6 |
| B | 0 | 0 | 0 | 0 | 2:1 | 0 |
| C | 0 | 0 | 0 | 0 | 2:1 | 0 |
| System Balance | 1.0 | 1.0 | 1.0 | 3.0 | — | 6 |

TABLE 3B

| | Resources | | | Task | Pacing | Balanced |
| | 1 | 2 | 3 | Resource | Ratio | State |
|---|---|---|---|---|---|---|
| Tasks | | | | | | |
| A | .5 | 1.0 | 1.0 | 2.5 | 2:1 | 5 |
| B | .333 | 0 | 0 | .333 | 2:1 | 1 |
| C | .167 | 0 | 0 | .167 | 2:1 | 0 |
| System Balance | 1.0 | 1.0 | 1.0 | 3.0 | — | 6 |

TABLE 3C

| | Resources | | | Task | Pacing | Balanced |
| | 1 | 2 | 3 | Resource | Ratio | State |
|---|---|---|---|---|---|---|
| Tasks | | | | | | |
| A | .333 | .667 | 1.0 | 2.0 | 2:1 | 4 |
| B | .333 | .333 | 0 | .667 | 2:1 | 1 |
| C | .333 | 0 | 0 | .333 | 2:1 | 1 |
| System Balance | 1.0 | 1.0 | 1.0 | 3.0 | — | 6 |

In accordance with the foregoing description of the present invention, a method and system is provided in which resources are assigned to multiple tasks, concurrently. As system requirements change, the resource ratios of each resource is modified dynamically by the system, thereby providing a smooth transition from one task to another task.

Modifications and substitutions by one of ordinary skill in the art are considered to be within the scope of the present invention which is not to be limited except by the claims which follow.

What is claimed is:

1. A method for allocating resources to multiple tasks in a telephony system comprising the steps of:

establishing at least a first and second task, each of said at least a first and second tasks including a pacing ratio, a task attribute and at least one group of available processes;

assigning said at least first and second task attributes to at least one resource, said at least one resource for servicing said at least one group of available processes for each of said at least first and second tasks;

initiating said at least first and second tasks;

initiating at least a first process from each of said at least one group of available processes for each of said at least first and second tasks, said step of initiating at least a first process comprising the steps of:

computing a resource ratio for said least one resource having said at least first and second task attributes, for each of said at least first and second task;

computing a task resource for each of said at least first and second tasks;

computing an initial balanced state value for each of said at least first and second tasks;

computing a current state value for each of said at least first and second tasks;

determining that said current state value is less than said computed initial balanced state value for at least one of said initiated at least first and second tasks; and initiating at least a second process from said at least one group of available process for at least one of said first and second tasks; and allocating said at least one resource having said at least first and second task attributes to said at least first and second task by a resource allocator, for servicing said at least a first process from each of said at least one group of available processes for each of said at least first and second tasks.

2. The method of claim 1, wherein said computed resource ratio for each of said at least one resource having said at least first and second task attributes equals the value of a quantity of one divided by a quantity of task attributes possessed by each of said at least one resource.

3. The method of claim 1, wherein said task resource for each of said at least first and second tasks equals a value of a sum of said computed resource ratios of each of said at least one resource having a corresponding task attribute.

4. The method of claim 1, wherein said computed initial balanced state value for each of said at least first and second tasks equals said computed task resource multiplied by said pacing ratio.

5. The method of claim 1, wherein the steps of initiating at least one process, further comprises the steps of;

detecting the end of at least a first process from said first task;

determining said first task is not in a balanced state; and determining that at least a second process is available to be initiated from said at least one group of available processes for said first task, after determining said first task is not in said balanced state; and initiating said second process from said at least one group of available processes for said first task.

6. The method of claim 1, wherein the step of initiating at least one process further comprises the steps of;

detecting the end of at least one process from said first task;

determining said first task is not in a balanced condition;

determining at least one other process is not available to be initiated from said first task, after determining said first task is not in said balanced condition;

modifying each of said resource ratios for each of said at least one resource having said at least first and second task attributes, after determining said one other process is not available to be initiated from said first task; and initiating at least one process from said at least one group of processes by said second task.

7. A method for allocating resources to multiple tasks in a telephony system comprising the steps of:

establishing at least a first and second task, each of said at least a first and second tasks including a task attribute and at least one group of available processes;

assigning said at least first and second task attributes to at least one resource, said resource for servicing said at least one group of available processes for each of said at least first and second tasks;

initiating said at least first and second tasks;

initiating at least a first process from each of said at least one group of available processes for each of said at least first and second tasks;

computing a resource ratio for said at least one resource having said at least first and second task attributes, for each of said at least first and second tasks, wherein said resource ratio equals the value of a quantity of one divided by a quantity of task attributes possessed by each of said at least one resource;

computing a task resource for each of said at least first and second tasks;

computing an initial balanced state value for each of said at least first and second tasks;

computing a current state value for each of said at least first and second tasks;

determining said current state value is less than said computed initial balanced state value for each of said initiated at least first and second tasks;

initiating at least a second process from said at least one group of available processes for each of said first and second tasks; and allocating said at least one resource having said at least first and second task attributes to said at least first and second task by a resource allocator, for servicing said at least a first and second process from each of said at least one group of available processes for each of said at least first and second tasks.

8. A method for allocating resources to multiple tasks in a telephony system comprising the steps of:

establishing at least a first and second task, each of said at least a first and second tasks including a task attribute and at least one group of available processes;

assigning said at least first and second task attributes to at least one resource, said resource for servicing said at least one group of available processes for each of said at least first and second tasks;

initiating said at least first and second tasks;

initiating at least a first process from each of said at least one group of available processes for each of said at least first and second tasks;

computing a resource ratio for said at least one resource having said at least first and second task attributes, for each of said at least first and second tasks, wherein said resource ratio equals the value of a quantity of one divided by a quantity of task attributes possessed by each of said at least one resource;

computing a task resource for each of said at least first and second tasks;

computing an initial balanced state value for each of said at least first and second tasks;

computing a current state value for each of said at least first and second tasks;

determining said current state value of at least one of said first and second tasks is less than said computed initial balanced state value for said respective initiated at least first and second tasks;

initiating at least a second process from said at least one group of available processes for said at least one of said first and second tasks having said current state value which is less than said computed initial balanced state value; and allocating said at least one resource having said at least first and second task attributes to said at least first and second task by a resource allocator, for servicing said at least a first and a second process from said at least one group of available processes for said at least first and second tasks.

* * * * *